United States Patent Office 2,949,766
Patented Aug. 23, 1960

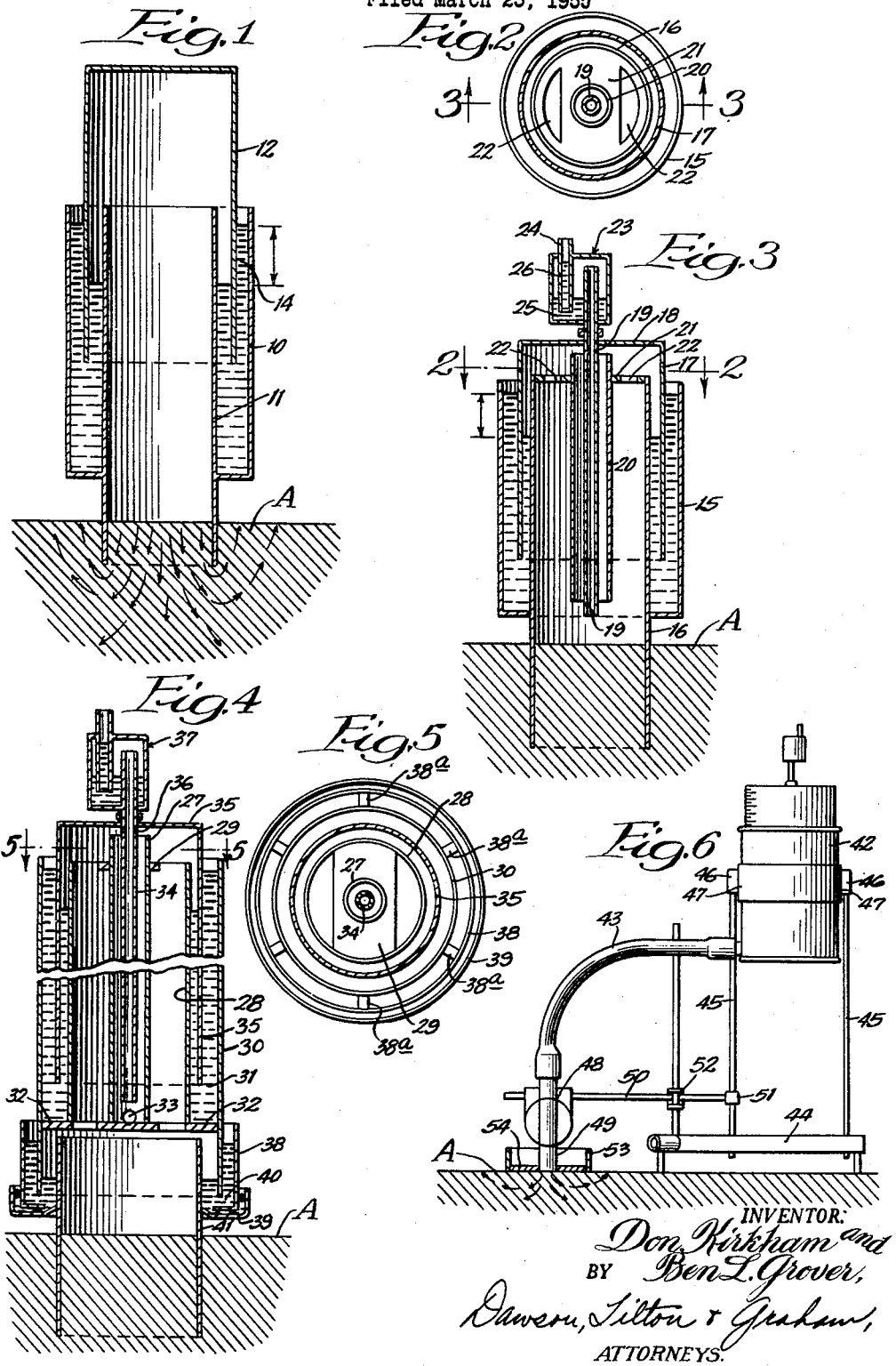

2,949,766

APPARATUS FOR MEASURING FLUID PERMEABILITY OF POROUS MATERIALS

Don Kirkham and Ben L. Grover, Ames, Iowa, assignors to Iowa State College Research Foundation, Inc., Ames, Iowa, a corporation of Iowa Filed Mar. 23, 1955, Ser. No. 496,182

8 Claims. (Cl. 73—38)

This invention relates to apparatus for measuring fluid permeability of porous materials. The invention is particularly useful in determining air permeability of soils, concrete, asphalt mats, and a variety of other air permeable or fluid permeable bodies.

An object of the present invention is to provide apparatus of compact and efficient construction for the accurate measuring of the permeability of materials. A further object is to provide portable apparatus which may be readily placed in position for accurately determining fluid permeability of porous bodies such as soil, concrete, asphalt mats, and a variety of other materials. A still further object is to provide in such apparatus means whereby the apparatus can be readily placed in position or removed for making other tests, etc., while at the same time preserving the apparatus in condition for readily making the other tests. Yet another object is to provide air permeameters of simple and effective design for measuring permeability to a given depth while enabling the use of part of the same equipment for other types of physical measurements without disturbing the soil and while also enabling the measurement of permeability of thin soil layers, such as crusts or silted-over surface soil, and the like. Other specific objects and advantages will appear as the specification proceeds.

The invention is shown, in illustrative embodiments, by the accompanying drawing, in which—

Figure 1 is a perspective view of apparatus showing a basic design for accomplishing the purposes set out herein; Fig. 2, a transverse sectional view of a specific form of apparatus embodying our invention, the section being taken as indicated at line 2—2 of Fig. 3; Fig. 3, a vertical sectional view, the section being taken as indicated at line 3—3 of Fig. 2; Fig. 4, a view similar to Fig. 3 but showing a modified form of apparatus; Fig. 5, a transverse sectional view, the section being taken as indicated at line 5—5 of Fig. 4; and Fig. 6, a vertical sectional view showing a method of utilization of the apparatus shown in Figs. 3 and 4 for measuring soil, etc. at a distance from the apparatus.

In Figure 1, there is illustrated a general form of equipment utilizing our invention. In the very simple form illustrated, 10 designates an annular water reservoir having for its inner wall an inlet tube 11, the inlet tube being extended so as to enter the ground or other material designated as A. 12 designates a float, which consists of a thin-walled cylinder closed at its upper end and having its lower end extending into the water or other liquid forming a seal within the tank 10. The float 12 may be provided with spaced graduations so as to indicate the movement of the float downwardly in the permeability test.

As the air enters the soil, the float falls, its weight maintaining a constant pressure independent of the rate of fall, and this pressure is indicated by the liquid level 14 shown by the arrows in Fig. 1. The volume of air entering the soil per unit time is a measure of the air permeability of the soil. Because the air in the float in this type of permeameter is actually replaced, the volume of air provided by it is much larger than that provided by previous equipment of similar size.

The unit shown in Figs. 2 and 3 is particularly useful for the measuring of soil or other materials in depth, and this unit will now be described. An annular liquid tank 15 is provided, the inner wall of the tank being provided by an inlet tube 16 which extends below the tank 15 and into the soil A. A float 17 is employed and the top wall 18 thereof is apertured centrally to receive a hollow stem 19. The stem 19 is located within a guide tube 20 supported within a top wall structure 21, as shown best in Fig. 2. The wall member 21 is provided with arcuate air ports 22, thus establishing communication between the air within the upper portion of the float 17 and the air within the upper portion of the inlet tube 16.

Upon the upper portion of the stem or tube 19 we prefer to mount a special form of manometer 23, which is preferably made of transparent plastic such as Lucite. The tube 19 extends well up into the chamber of the transparent casing 23, as shown more clearly in Fig. 3. A liquid level tube 24 extends through the top of the chamber 23 and downwardly into the lower portion of the chamber but above the bottom thereof. A body of water or other liquid 25 is maintained within the manometer shell 23. The purpose of the special manometer structure shown is to permit an observation of the water level 26 within the tube 24 and which level indicates the pressure within the float inside the above ground portion of the inlet tube 16. If desired, the tube 24 or the shell 23 may be equipped with graduations for determination of the liquid level within the tube 24. The pressure within the inlet tube may also be computed from the weight of the float per unit of its cross section. The tube 19 is fixed to the float 17 so that the two structures may be lifted simultaneously. In effect, the manometer which has just been described consists of two legs, but the legs are not arranged in the usual manner. The small leg of the manometer extends from near the bottom of the manometer upward into the atmosphere, and this comprises the tube 24. The large leg is the cylinder or container 23 out of which the small leg extends and into which (from below) there extends the stem or tube 19. The large leg is thus the main body of the manometer or shell 23, and it is sealed at its top and bottom, except where the two small tubes enter. As stated, when the float is resting on the water, the water rises within the small leg, as indicated by the numeral 26.

The manometer provides a unique feature. It is designed in such a way that, if for any reason the float 17 needs to be raised, this can be accomplished without applying suction to the soil more than a height of water column constituting that height between the level shown in Fig. 3 and the bottom of the tube 24. When by raising the float this suction is attained, air can enter through the small leg or tube 24 and pass through the manometer into the air chamber. Without this feature, the float cannot be removed in a reasonable time without sucking water out of the reservoir.

*Operation*

In the operation of the unit shown in Figs. 2 and 3, the inlet tube 16 is introduced into the soil or other porous body to the selected depth. The air from the air chamber enters the soil by passing down through the tube 16, and the float falls as the air enters the soil. The rate of fall is a measure of the permeability. As the float falls, its weight maintains a constant pressure independent of the rate of fall, and this pressure is visually determined by the manometer 23.

To obtain the air permeability in c.g.s. absolute units, an equation based on Darcy's law is used, namely $$V/t = kA\Delta P/n \quad (1)$$

Symbols in (1) are as follows: V is the volume (cc.) of air forced into the soil in time $t$ (sec.), $\Delta P$ is the gauge pressure of the air (dynes/cm.$^2$) in the air chamber, $n$ is the viscosity (poise) of the air, A (cm.) is a constant, which depends on the geometry of the air flow boundaries in the soil, and $k$ is the air permeability in cm.$^2$.

In the movement of the float, the side walls thereof are kept from rubbing against the reservoir walls by means of the stem and guide tube structure, the guide tube 20 being releasably fixed by the support or wall 21 to the inner reservoir wall (inlet tube 16), while the small stem or small guide tube 19 is attached actually to the float 18.

In the structure shown, the large guide tube 20 and the support 21 therefor are not fastened permanently to the inlet tube 16, which forms the inner wall of the water reservoir, but, with the float, can be moved from one water reservoir to another. The float and its guide tubes can thus serve to provide air for a number of units which are attached to the soil.

In the permeameter unit shown in Figs. 4 and 5, the large guide tube 27 is fastened permanently to the inner wall 28 of the water reservoir by the supporting means 29. The outer wall 30 of the water reservoir is spaced from the inner wall 28 to provide a tank for holding the water or other fluid 31. A closure for the water tank is provided by the plate 32, which also forms a closure for the bottom of the guide tube 27. We connect the water reservoir with the interior of the guide tube 27 through a connecting tube 33, and the water within the tube 27 is thus utilized to provide lubrication. The stem 34 is provided near its top, and just below the float wall 35, with air inlet openings 36 through which air may pass into communication with the top of the chamber in the manometer housing 37. The manometer 37 is the same which has heretofore been described in connection with Fig. 3.

In the unit shown in Figs. 4 and 5, the outer reservoir wall 30 is extended downwardly and we provide about the lower edge thereof a water seal. This water seal or trough is formed by a transparent plastic cylinder 38 (preferably formed of Lucite), and about the lower end of the cylinder 38 is provided a closure 39 to form a seal for the water or other liquid 40. The cylinder 38 is supported by means of ribs 38a, as shown more clearly in Fig. 5. Any suitable means for forming the seal may be employed. For example, a wide rubber band may be drawn around the cylinder 38 and then the lower portion thereof brought against the inlet pipe 41 to provide the seal desired.

When the trough is partly filled with water and the float is released in the water reservoir, the pressure thus created will force a column of water of the height shown in the cylinder 38 to rise between the extension of the wall 30 and the cylinder 38. This column of water will counterbalance the air pressure inside the air chamber and thus no air can escape. A sufficiently rapid passage of air, by artificial leaks, if necessary, is desired between the top of the inlet tube and the bottom of the water reservoir so that the air pressure and water column can come to equilibrium rapidly and thus enable an accurate reading to be made. With the resilient seal which has been described, the water trough arrangement provides a positive seal which can be rapidly put in place and removed.

In the structure shown in Fig. 6, a permeameter 42 may be employed which is similar, or substantially identical, to that shown in Figs. 2 and 3, or that shown in Figs. 4 and 5. We simply provide in Fig. 6 means for extending the inlet tube for a substantial distance from the apparatus and for supporting it so that the inlet tube may be accurately applied to the soil or other material. This apparatus is particularly useful in measuring the permeability of thin soil layers such as crusts or silted-over surface soil. In this apparatus, we provide a flexible tube or conduit 43 which leads from the inlet tube of the apparatus 42. If desired, the tube 43 may be simply connected to an L-shaped tube within the float space of the apparatus 42, with the vertical leg of the tube extending upwardly into the top portion of the float space. In any arrangement, the flexible tube 43 may be thus regarded as an extension of the inlet tube of the apparatus shown in Figs. 2 and 3 or Figs. 4 and 5.

Suitable means for supporting the apparatus 42 and the inlet tube 43 may be employed. In the illustration given, we provide a tubular base 44 equipped with standards 45 received within tubes 46 welded to a supporting sleeve 47, which in turn is secured to the outer side of the water reservoir 42. A cylindrical member 48 is apertured to receive an inlet tube extension 49 and member 48 is carried by a rod 50 having one end received within a guide collar 51 and an intermediate portion received within a guide clamp 52. By this means, the inlet tube extension 49 may be accurately positioned over a soil or other surface, as illustrated in Fig. 6. Around the inlet tube extension 49 is placed a collar 53, and liquid paraffin is poured into the collar to form the sealing layer 54. We have found it desirable to introduce a small body of putty around the lower end of the inlet tube extension 49 so as to form a seal which will prevent paraffin from flowing under the inlet 49 and into the tube. If desired, the lower end of the tube may be provided with a small groove for receiving a ring of putty, or the like.

In the operation of the structure shown in Figs. 4 and 5, the inlet tube 41 is preferably inserted into the soil or other material to a given depth, as shown in Fig. 4. In the operation of the apparatus shown in Fig. 6, however, since it is desired to measure the permeability of the top crust of the soil or other body, the inlet tube 49 is not extended into the soil but is substantially even with the top surface of the soil and a wide seal of paraffin is formed about it so as to enable an accurate determination of the permeability of the soil crust or thin top portion to be determined.

In all of the structures shown, it will be noted that no pump or positively-operating mechanism is required for producing pressure within the apparatus, and the float itself, with its seal in the annular liquid tank, is an automatic means for supplying the pressure at a constant rate as the air flows out of the inlet tube and as the float drops within the sealing liquid chamber.

While we have indicated that paraffin may be used as a sealing material, it will be understood that gummy rubber or any other suitable material may be employed.

In the new structures described, it will be noted that no cocks or valves are required for controlling the air flow. Also, except in the apparatus shown in Fig. 6, no extraneous hoses or conduits, with their accompanying friction losses, are needed. As to the structure shown in Fig. 6, it will be noted that the hose (inlet tube 43) is large enough to make air friction pressure losses in the hose negligible compared with friction losses in the soil. Further, with respect to the apparatus of Fig. 6, it will be noted that a surface or section of surface need not be removed or gouged into, or permanently disturbed, as the paraffin or other sealing material 54 may be removed at the end of a measurement. The apparatus is not only useful in the measurement of air permeability of soil, crusts, concrete structures and paving structures, but also plaster walls, and the like, without disturbing the wall, etc.

While, in the foregoing specification, we have set forth specific structures in considerable detail for the purpose of illustrating an embodiment of the invention, it will be understood that such details of structure may be varied widely without departing from the spirit of our invention.

We claim:

1. In apparatus for measuring fluid permeability of a porous body, an annular tank containing liquid, a hollow float having a closed top and an open bottom freely mounted within said tank and trapping fluid therein above said liquid, a hollow pipe communicating with the interior of said float, a hollow stem also communicating with the interior of said float and extending above said float, a casing providing a chamber about the upper portion of said stem so that the top portion of the stem extends into the upper portion of said casing, and a second tube extending through the top wall of said casing and downwardly into the lower portion of said casing, said casing being adapted to contain a liquid sealing the lower end of said second tube whereby said casing acts as a manometer to yield an indication of the pressure within said float.

2. The structure of claim 1, in which said stem is secured to said float.

3. The structure of claim 1, in which said stem is guided within a guide tube rigidly supported centrally of said tank.

4. The structure of claim 1 in which said casing and said second tube are transparent to permit visual observation of a liquid level in said manometer.

5. The structure of claim 4 in which one of said casing and second tube are equipped with liquid level indicia.

6. In apparatus for measuring fluid permeability of a porous body, an annular tank containing a liquid, a hollow float having a closed top and an open bottom freely mounted within said tank and trapping fluid therein above said liquid, an inlet pipe communicating with the interior of said float and having an open end adapted to enter into sealing engagement with a porous body, and manometer means on said closed top communicating with the interior of said float, said manometer means being arranged to permit fluid flow therethrough into said float when said float is removed from said tank.

7. The structure of claim 6 in which said manometer comprises a casing providing a chamber on said closed top, a hollow stem entering said chamber and communicating with the interior of said float, said hollow stem terminating adjacent the top of said chamber, and a hollow tube extending downwardly into said chamber and terminating adjacent the bottom of said chamber, said second tube extending upwardly out of said chamber and communicating with the atmosphere, said casing being adapted to contain a liquid sealing the lower end of said tube.

8. The structure of claim 6 in which said inlet pipe is equipped with an annular tank containing liquid and the first-mentioned annular tank is equipped with an annular depending skirt received in the annular tank of said inlet pipe.

References Cited in the file of this patent
UNITED STATES PATENTS

| | | |
|---|---|---|
| 1,234,505 | Stillman | July 24, 1917 |
| 1,421,903 | Burberl | July 4, 1922 |
| 2,194,891 | Dietert | Mar. 26, 1940 |
| 2,348,985 | Lewis | May 16, 1944 |
| 2,516,188 | Dietert et al. | July 25, 1950 |